United States Patent
Martin et al.

(10) Patent No.: US 9,176,694 B2
(45) Date of Patent: Nov. 3, 2015

(54) PRINTER WITH AUDIBLE SIGNAL

(75) Inventors: Nathaniel G. Martin, Rochester, NY (US); Patricia L. Swenton-Wall, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 576 days.

(21) Appl. No.: 12/912,126

(22) Filed: Oct. 26, 2010

(65) Prior Publication Data

US 2012/0099140 A1    Apr. 26, 2012

(51) Int. Cl.
G06F 15/00    (2006.01)
G06F 3/12    (2006.01)
B41F 33/00    (2006.01)

(52) U.S. Cl.
CPC ............ *G06F 3/1279* (2013.01); *G06F 3/1207* (2013.01); *G06F 3/1259* (2013.01); *G06F 3/121* (2013.01); *G06F 3/1264* (2013.01)

(58) Field of Classification Search
None
See application file for complete search history.

(56) References Cited

U.S. PATENT DOCUMENTS

| | | | |
|---|---|---|---|
| 4,369,334 A | 1/1983 | Nakatani et al. | |
| 5,593,236 A | 1/1997 | Bobry | |
| 5,717,384 A | 2/1998 | Johnson et al. | |
| 6,032,004 A | 2/2000 | Mirabella, Jr. et al. | |
| 7,139,493 B2 | 11/2006 | Ito et al. | |
| 7,170,625 B2 | 1/2007 | Somei | |
| 7,269,361 B2 | 9/2007 | Huss et al. | |
| 2003/0025935 A1* | 2/2003 | Somei | 358/1.15 |
| 2003/0218767 A1* | 11/2003 | Schroath et al. | 358/1.14 |
| 2008/0055097 A1* | 3/2008 | Chidakel et al. | 340/628 |
| 2009/0059281 A1* | 3/2009 | Murahashi et al. | 358/1.15 |
| 2009/0102869 A1* | 4/2009 | Niimi et al. | 347/2 |
| 2011/0002014 A1* | 1/2011 | Tani et al. | 358/403 |
| 2011/0032557 A1* | 2/2011 | Bernstein et al. | 358/1.12 |
| 2011/0140896 A1* | 6/2011 | Menzel | 340/573.1 |

FOREIGN PATENT DOCUMENTS

| | | | | |
|---|---|---|---|---|
| JP | 3058879 | | 3/1991 | |
| JP | 04099685 A | * | 3/1992 | ............... B41J 29/46 |
| JP | 6064274 | | 3/1994 | |
| JP | 8029717 | | 2/1996 | |
| JP | 9097146 | | 4/1997 | |
| JP | 11309924 A | * | 11/1999 | ............... B41J 29/38 |

* cited by examiner

*Primary Examiner* — Barbara Reinier
*Assistant Examiner* — Pawandeep Dhingra
(74) *Attorney, Agent, or Firm* — Gibb & Riley, LLC

(57) ABSTRACT

Methods and systems begin when a printing device receives a print job. The methods and systems identify a document type within the print job using a processor of the printing device. The methods and systems also determine if the document type requires an audible alarm using the processor. The methods and systems print the print job using a printing engine of the printing device. If the document type requires the audible alarm, the methods and systems produce an audible alarm using a speaker of the printing device after the printing is complete.

8 Claims, 4 Drawing Sheets

PRINTER WITH AUDIBLE SIGNAL

BACKGROUND

Embodiments herein generally relate to printing devices and more particularly to printing devices that produce an audible signal when a certain type of document is printed.

Printing is increasingly becoming integrated into workflows, where the production of the printed document initiates a series of activities or workflows. Currently people react to the mechanical sound of the printer made during the printing process, and then check the printer for output. If the printed document needs to be processed further in a workflow, the mechanical sound of the printer printing can initiate the workflow; however, the mechanical sound of the printer printing can cause false alarms if the printed document does not need to be further processed in a workflow.

SUMMARY

One exemplary method embodiment herein begins when a printing device receives a print job. The method identifies a document type within the print job using a processor of the printing device. The document types can be based on the format of the print job, the content of the print job, the length of the print job, a classification of an owner of the print job, etc.

The method also determines if the document type requires an audible alarm using the processor. To do so, the processor can, for example, compare metadata or PDL data within the print job against a predetermined metadata PDL alarm standard. Further, the methods herein can compare an image of the printed document produced by the print job against a predetermined document image format alarm standard. Also, the methods herein can compare the length of the print job against a predetermined length alarm standard. Similarly, the methods herein can compare an identification of an owner of the print job against a predetermined alarm notification listing.

The method prints the print job using a printing engine of the printing device. If the document type requires the audible alarm, the methods herein produce an audible alarm using a speaker of the printing device (and potentially illuminates a lighting device of the printing device) after the printing is complete. The audible alarm can be different for different types of documents. Further, the audible alarm initiates a workflow for a printed document produced during the printing.

A printing device embodiment herein comprises a communications port operatively connected to a processor. The communications port receives a print job. The processor identifies the document type within the print job, and the processor determines if the document type requires an audible alarm. The processor can do this by comparing metadata within the print job against a predetermined metadata alarm standard, comparing an image of a printed document produced by the print job against a predetermined document image format alarm standard, comparing the length of the print job against a predetermined length alarm standard, comparing an identification of an owner of the print job against a predetermined alarm notification listing, etc.

Further, a printing engine is operatively connected to the processor. The printing engine prints the print job. Also, a speaker is operatively connected to the processor. The speaker produces an audible alarm after the printing is complete if the document type requires the audible alarm. Additionally, a lighting device can be operatively connected to the processor. If the document type requires the audible alarm, the lighting device (in addition or alternatively) illuminates after the printing is complete.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein produce an audible signal based on the type of document being printed to signal the start of a workflow. The embodiments herein recognize the document either by associated metadata or by evidence internal to the document. The embodiments herein then select the audible signal associated with that type of document from a sound table and play that sound on the speaker.

Thus, in one example, clerks at the front desk of an office can be informed that patients have been scheduled for an appointment through a printed document produced on their local networked printer. These clerks need to process the appointment before the patient arrives, so they can use the mechanical sound of the printer printing the document to signal the beginning of the workflow of processing the upcoming appointment. However, if the same local networked printer is also used to print out other documents, the mechanical sound of the printer printing a document cannot reliably be used to begin the workflow of processing an upcoming appointment. Therefore, embodiments herein provide a unique auditory (and/or visual) alarm or signal to indicate that the workflow for processing an upcoming appointment needs to be started.

Figure 1:
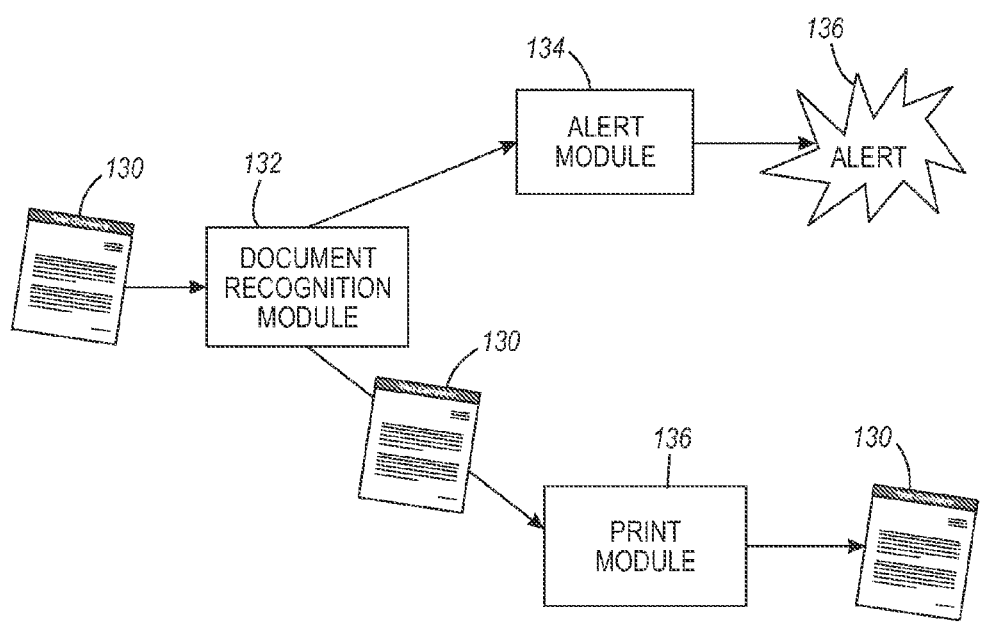
FIG. 1 is a schematic block diagram illustrating various embodiments herein.

More specifically, FIG. 1 illustrates one example of how different modules can be utilized with the embodiments herein. FIG. 1 illustrates that a print job 130 is processed by a document recognition module 132. The document recognition module 132 can be within a printing device, can be located within a print server connected to the printing device, or can be located within another device connected in a wide area network (such as in cloud computing).

The document recognition module 132 forwards the print job 130 to a print module 136 which prints the print job 130 or causes the print job 130 to be printed as a printed document 138. The print module 136 can be a physical printer or can be a print server connected to various printers.

In addition, the document recognition module 132 identifies whether an alarm or alert is required for the print job 130. If an alert is required, the document recognition module 132 notifies an alert module 134, which produces an alarm or alert 136. If the document recognition module 132 does not recognize an alarm requirement within the print job 130, the document recognition module 132 prints without sending a signal to the alert module 134, preventing any alert or alarm sound from being produced.

When identifying whether an alarm or alert is required, the document recognition module 132 can operate in a number of different ways to differentiate between the types of documents that require alarms and the types of documents that do not require alarms. For example, the document recognition module 132 can recognize meta-data flagging the need for an alarm within the print job. Such metadata is specifically generated for the print job 130 by the component that created the print job 130 using a program that associates the metadata with the print job 130. Alternatively, a flag indicating that an alarm is required could be encoded as a comment in the Page Definition Language (PDL) of the print job 130. The document recognition module 132 can recognize either the metadata or the flag within the PDL print job.

As another option, if the print job 130 is not accompanied by associated metadata or the PDL does not include an alarm flag, the document recognition module 132 can recognize some specific features of the document 138 within the print job 130 to determine whether the document 138 is the type that requires an alarm or alert.

In addition, the document can be processed through a recognition algorithm such as DICE (Document Image Categorization Engine) or the image recognition algorithms in GVT (General Visual Toolkit) a tool kit for processing graphical information, which are commercially available image recognition systems from Xerox Corporation, Norwalk Conn., USA. In some instances, these features can be retrieved from the PDL of the print job 130, while in other instances, the features are retrieved from a scan of the printed document 138. The recognition algorithm recognizes particular images or pieces of images on the document 138. For example, the recognition algorithms can identify certain keywords, certain document structures or certain document formats and if these items match certain predetermined alert conditions, the document recognition module 132 will cause in the alert module 134 to provide an alarm or alert 136.

Further, different sounds (or different types of alerts) can be used to initiate different workflows that may be required for different document types. Therefore, one document type may require that a workflow for preparation for an appointment needs to be started by one clerk within an office, while a different type of document may require that a workflow for billing procedures be started by a different clerk within the same office. The document recognition module 132 can recognize these two different types of documents and cause the alert module 134 to produce different sounding alarms or alerts, depending upon which type of document is printed.

More specifically, after recognizing what type of document is contained within the print job 130, the document recognition module 132 looks up the appropriate signal for that type of document in, for example, a look up table and sends an appropriate signal to the alert module 134 to produce a specific type of sound 136. Similarly, the alert module 134 comprises a look up table that associates a signal as generated by the document recognition model with a signal required to create an audible signal. For example, each document signal could be associated with a text string that is passed to a text to speech module. Alternatively, the signal could be associated with a wave form that is passed directly to a speaker.

The alert module 134 can also (or alternatively) produce different kinds of alerts such as raising a flag or flashing a light. Such visible alerts could be useful in cases where sound is undesirable.

The alert module 134 can also send messages (such as text messages, e-mail messages, instant messages, etc.) to the user who is to perform the workflow. Thus, the person to whom the message is to be sent and the method by which they are to be notified is kept in the table associated with the signal generated by the document recognition module 132. When the document arrives, the system generates an appropriate message to the appropriate user. While it is common for printers to notify the person who requested a print job when the printing has been completed; the current embodiments are different than this conventional situation because the current embodiments do not necessarily notify the person who requested the print job; rather the current environments notify the person who needs to performed a workflow with the printed document. Moreover, notification here is based on the type of document being printed, not just on the completion of the print operation.

Figure 2:
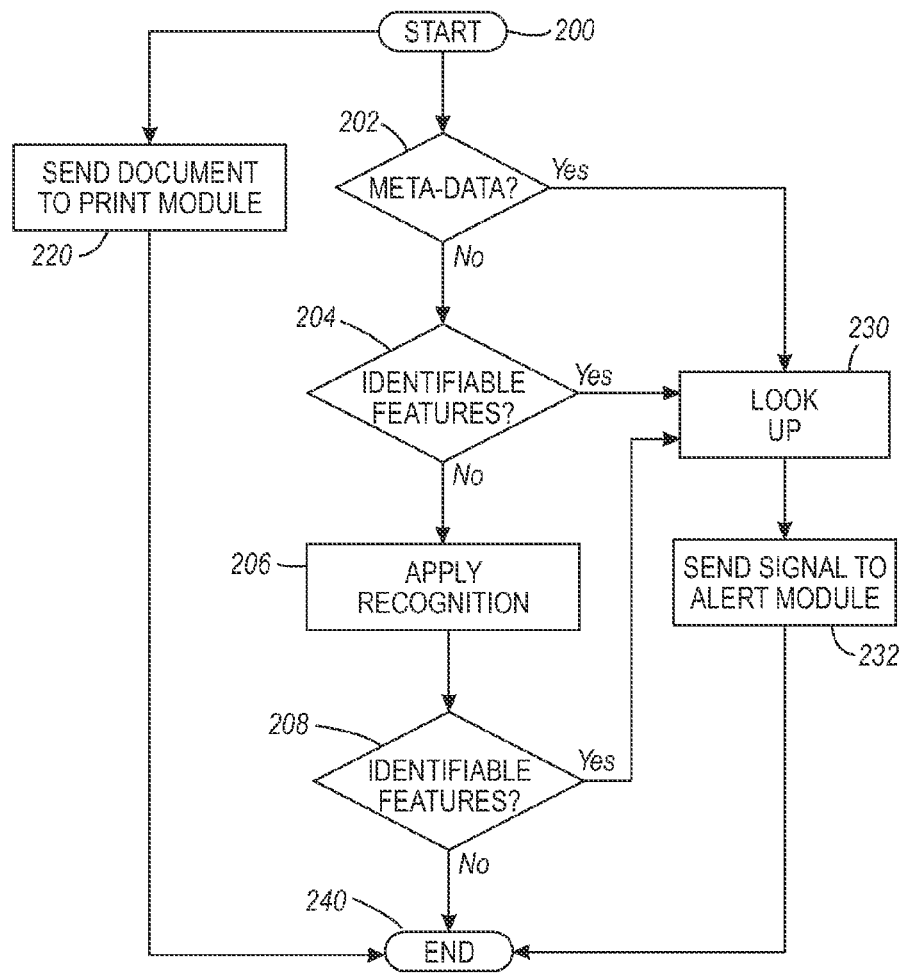
FIG. 2 is a schematic block diagram illustrating various embodiments herein.
Figure 3:
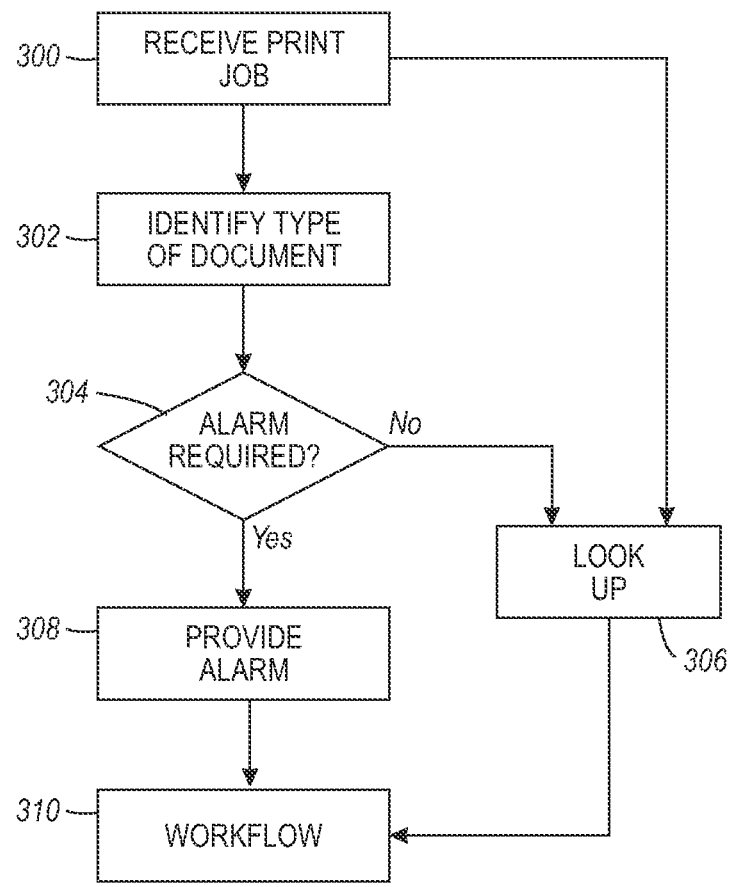
FIG. 3 is a schematic block diagram illustrating various embodiments herein.
Figure 4:
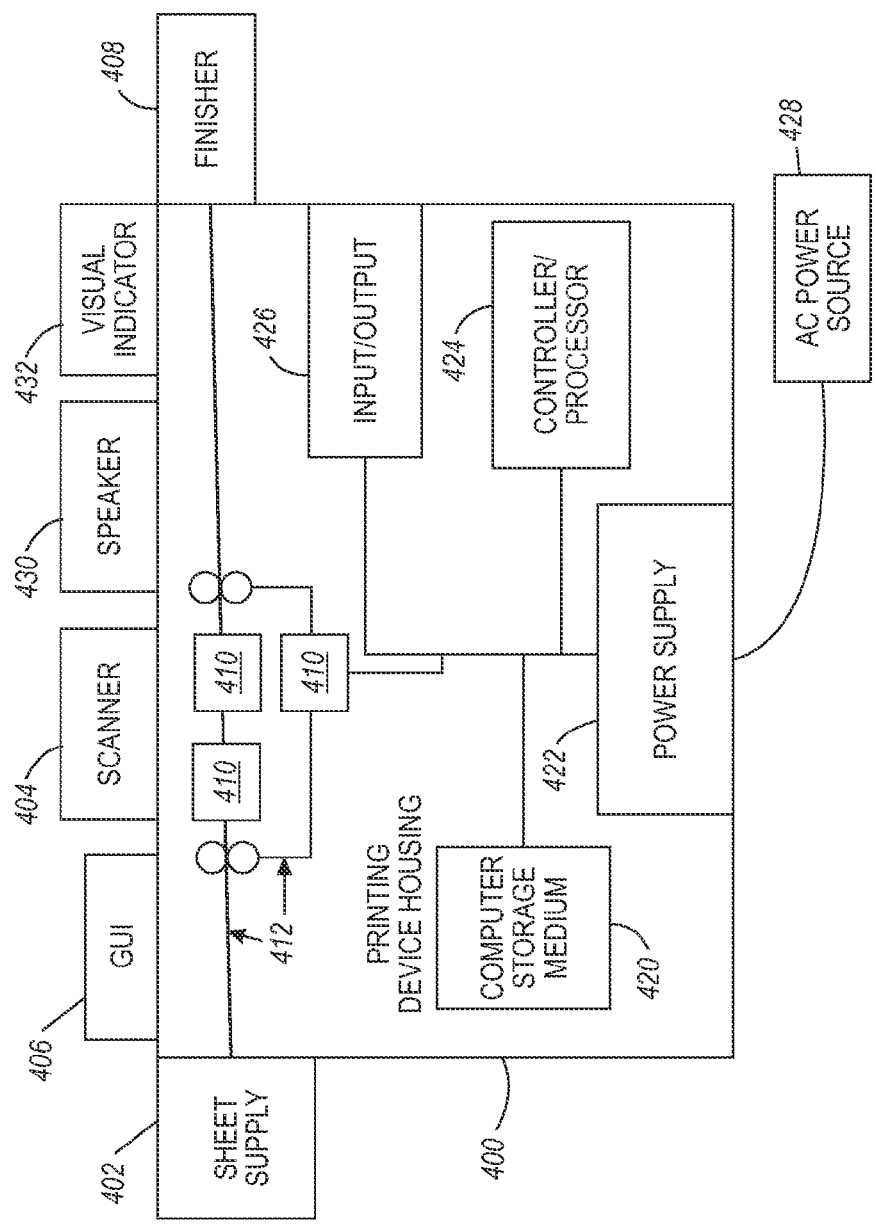
FIG. 4 is a schematic block diagram of a printing device according to embodiments herein.

FIG. 2 is a flowchart that illustrates operations of embodiments herein with respect to the modules shown in FIG. 1 and FIG. 3 is a flowchart that illustrates operations of embodiments herein with respect to the printing device shown in FIG. 4. Processing in FIG. 2 begins in item 200 where the document recognition module sends a document to the print module in item 220, and also evaluates whether metadata is available in item 202. If the metadata is available, processing proceeds to item 230 where the lookup table is utilized to determine if and what type of alert should be provided. In item 204, the document recognition module determines whether identifiable features are maintained within the document. In item 206, the recognition algorithm determines whether any appropriate features are within the document and item 208 represents the recognition of such features. If such features are identified in items 204 or 208, processing again proceeds to item 230 to identify if and what type of alert should be provided. If an alert is needed, processing proceeds from item 230 to item 232 were the alert module is notified of the need for and the type of alert that should be provided. Processing ends and item 240.

FIG. 3 illustrates another method embodiment herein that begins when a printing device receives a print job 300. Then, in item 302, the method identifies a document type within the print job using a processor of the printing device. Many different document types are mentioned above, in addition document types can be based on the format of the print job, the content of the print job, the length of the print job, a classification of an owner of the print job, etc.

Thus, for example, the methods herein can identify a certain form of document (e.g., an appointment document, a billing document, a marketing document, etc.) based on the structure of the document and/or where information is maintained within the document. Depending upon the form of the document, different individuals may be required to perform different workflows on the document.

Similarly, the content of the print job can be determined by observing various keywords, names, number combinations, etc. Depending upon the document content, different individuals may be required to perform different workflows on the document. Also, if a print job is above or below a certain length, it may require special handling (special binding, special trimming, etc.) performed in a workflow different from documents that do not exceed a certain length. Further, certain users that created the print job may require special handling of their documents, thereby requiring yet another unique workflow. Each of these different workflows can be audibly or visually identified using the methods and devices described herein.

In item 304, the method also determines if the document type requires an audible alarm using the processor. To do so, the processor can, for example, compare metadata within the print job against a predetermined metadata alarm standard. Further, the methods herein can compare an image of the printed document produced by the print job against a predetermined document image format alarm standard. Also, the methods herein can compare the length of the print job against a predetermined length alarm standard. Similarly, the methods herein can compare an identification of an owner of the print job against a predetermined alarm notification listing that require specific processing workflows for their printed documents.

In item 306 the method prints the print job using a printing engine of the printing device. If the document type requires the audible alarm, in item 308 the methods herein produce an audible alarm using a speaker of the printing device (and/or potentially illuminate a lighting device or change some other visual display of the printing device) after the printing in item 306 is complete. The audible alarm can be different for different types of documents. Further, the audible alarm initiates a workflow 310 for a printed document produced during the printing.

FIG. 4 illustrates a printing device embodiment herein, which can comprise, for example, a printer, copier, multi-function machine, etc. The printer body housing 400 has one or more functional components that operate on power supplied from the alternating current (AC) 428 by the power supply 422. The power supply 422 converts the external power 428 into the type of power needed by the various components.

The printing device 400 includes a controller/processor 424, at least one marking device (printing engine) 410 operatively connected to the processor 424, a media path 412 positioned to supply sheets of media from a sheet supply 402 to the marking device(s) 410 and a communications port (input/output) 426 operatively connected to the processor 424 and to a computerized network external to the printing device. After receiving various markings from the printing engine(s), the sheets of media pass to a finisher 408 which can fold, staple, sort, etc., the various printed sheets.

Further, the printing device 400 includes at least one accessory functional component (such as a scanner/document handler 404, sheet supply 402, finisher 408, etc.) and graphic user interface assembly 406 that also operate on the power supplied from the external power source 428 (through the power supply 422).

The processor 424 controls the various actions of the printing device. A computer storage medium 420 (which can be optical, magnetic, capacitor based, etc.) is readable by the processor 424 and stores the look up tables and instructions that the processor 424 executes to allow the multi-function printing device to perform its various functions, such as those described herein.

The communications port 426 receives the print job. The processor 424 identifies the document type within the print job, and the processor 424 determines if the document type requires an audible alarm. The processor 424 can do this by comparing metadata within the print job against a predetermined metadata alarm standard within the computer storage medium 420, comparing an image of a printed document produced by the print job against a predetermined document image format alarm standard within the computer storage medium 420, comparing the length of the print job against a predetermined length alarm standard within the computer storage medium 420, comparing an identification of an owner of the print job against a predetermined alarm notification listing within the computer storage medium 420, etc.

Further, the printing engine 410 prints the print job. Also, a speaker 430 is operatively connected to the processor 424. The speaker 430 produces an audible alarm after the printing is complete if the document type requires the audible alarm.

Additionally, a visual indicator 423, such as lighting device, pop-up flag, etc., can be operatively connected to the processor 424. If the document type requires the audible alarm, the visual indicator 423 changes (illuminates, pops-up, etc.) after the printing is complete, with or without issuing the audible alarm.

The embodiments herein integrate printed paper documents into digital workflows. This capability is becoming increasingly important for the survival of hallway printing devices as data storage moves from paper to electronic databases. When information is stored electronically, data is distributed by copying it, making the copier a crucial piece of office equipment. The copy operation involves a human taking a piece of paper to the copy machine. When information is distributed in paper form from an electronic database, it needs to be printed. If the printer is not directly associated with the user's workstation, the print may arrive at the printer without the user noticing it. Moreover, since printing may be driven by a workflow rather than requested by the user, the user may not have requested the print. The example used to motivate the embodiments herein is an example of such a case where the people at the front desk do not request the printout that notifies them of an appointment, another sends it to them. In such a case, having the ability to alert people who are not looking at the printer is very helpful.

Further, while conventional printing devices can issue audible alarms upon the occurrence of some faulty condition (low toner, low paper, paper jam, etc.) or a printing device can produce a certain sound when performing printing operations, the embodiments herein breakaway from such conventional methods and systems by only producing an audible alarm for certain types of documents. Further, with embodiments herein, the alarm that is produced indicates that a workflow using the printed document should be started. Documents that do not require an alarm are not subject to the workflow. Further, depending upon the type of document, different types of alarms can be generated, were each different alarm is associated with a different workflow that can be performed with the printed document.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising: receiving a print job using a printing device; identifying a document type of said print job based on text and images within said print job using a processor of said printing device; determining if said document type requires an audible alarm using said processor of said printing device, said determining producing said audible alarm to be specific to a workflow for a printed document produced from said print job based on said document type, said document type being based on at least one of a format of said print job, a content of said print job, a length of said print job, and a classification of an owner of said print job, said workflow comprising a series of activities performed by a user utilizing said printed document; printing said print job using a printing engine of said printing device; and if said document type requires said audible alarm, producing said audible alarm using a speaker of said printing device after said printing is complete to initiate said workflow, said audible alarm comprising different sounds for different workflows, and said different sounds informing said user to perform one of said different workflows by utilizing different information within said printed document to perform different activities based on said different sounds, said audible alarm being different for different types of documents.

2. The method according to claim 1, further comprising, if said document type requires said audible alarm, changing a visual indicator of said printing device after said printing is complete.

3. A method comprising: receiving a print job using a printing device; identifying a document type of said print job based on text and images within said print job using a processor of said printing device; determining if said document type requires an audible alarm using said processor of said printing device by: comparing an image of a printed document produced by said print job against a predetermined document image format alarm standard; and comparing text within said print job against a predetermined alarm text listing, said determining producing said audible alarm to be specific to a workflow for a printed document produced from said print job based on said document type, said document type being based on at least one of a format of said print job, a content of said print job, a length of said print job, and a classification of an owner of said print job, said workflow comprising a series of activities performed by a user utilizing said printed document; printing said print job using a printing engine of said printing device; and if said document type requires said audible alarm, producing said audible alarm using a speaker of said printing device after said printing is complete to initiate said workflow, said audible alarm comprising different sounds for different workflows, and said different sounds informing said user to perform one of said different workflows by utilizing different information within said printed document to perform different activities based on said different sounds, said audible alarm being different for different types of documents.

4. The method according to claim 3, further comprising, if said document type requires said audible alarm, changing a visual indicator of said printing device after said printing is complete.

5. A printing device comprising: a processor; a communications port operatively connected to said processor, said communications port receiving a print job, said processor identifying a document type of said print job based on text and images within said print job, said processor determining if said document type requires an audible alarm, said processor producing said audible alarm to be specific to a workflow for a printed document produced from said print job based on said document type, said document type being based on at least one of a format of said print job, a content of said print job, a length of said print job, and a classification of an owner of said print job, said workflow comprising a series of activities performed by a user utilizing said printed document; a printing engine operatively connected to said processor, said printing engine printing said print job; and a speaker operatively connected to said processor, said speaker producing said audible alarm after said printing is complete to initiate said workflow if said document type requires said audible alarm, said audible alarm comprising different sounds for different workflows, and said different sounds informing said user to perform one of said different workflows by utilizing different information within said printed document to perform different activities based on said different sounds, said audible alarm being different for different types of documents.

6. The printing device according to claim 5, further comprising a visual indicator operatively connected to said processor, if said document type requires said audible alarm, said visual indicator changes after said printing is complete.

7. A printing device comprising: a processor; a communications port operatively connected to said processor, said communications port receiving a print job, said processor identifying a document type of said print job based on text and images within said print job, said processor determining if said document type requires an audible alarm by: comparing an image of a printed document produced by said print job against a predetermined document image format alarm standard; and comparing text within said print job against a predetermined alarm text listing, said processor producing said audible alarm to be specific to a workflow for a printed document produced from said print job based on said document type, said document type being based on at least one of a format of said print job, a content of said print job, a length of said print job, and a classification of an owner of said print job, said workflow comprising a series of activities performed by a user utilizing said printed document; and a speaker operatively connected to said processor, said speaker producing said audible alarm after said printing is complete to initiate said workflow if said document type requires said audible alarm, said audible alarm comprising different sounds for different workflows, and said different sounds informing said user to perform one of said different workflows by utilizing different information within said printed document to perform different activities based on said different sounds, said audible alarm being different for different types of documents.

8. The printing device according to claim 7, further comprising a visual indicator operatively connected to said processor, if said document type requires said audible alarm, said visual indicator changes after said printing is complete.

* * * * *